United States Patent [19]

Lynn et al.

[11] 3,801,828

[45] Apr. 2, 1974

[54] PULSE WIDTH DISCRIMINATOR

[75] Inventors: Dale Everett Lynn, Freehold; Everett Lewis Poll, Brick Town, both of N.J.

[73] Assignee: Bell Telephone Laboratories Incorporated, Murray Hill, N.J.

[22] Filed: Dec. 26, 1972

[21] Appl. No.: 317,941

[52] U.S. Cl. .................. 307/231, 307/234, 307/265, 328/111, 328/127

[51] Int. Cl. .............................................. H03k 5/20

[58] Field of Search ........... 307/231, 234, 235, 265; 328/111, 112, 113, 127, 55, 146, 117

[56] References Cited

UNITED STATES PATENTS

| | | | |
|---|---|---|---|
| 2,534,264 | 12/1950 | Hoeppner | 328/117 |
| 2,599,305 | 6/1952 | Westwood | 328/55 X |
| 3,073,972 | 1/1963 | Jenkins | 328/55 X |
| 3,105,939 | 10/1963 | Onno et al. | 328/146 X |
| 3,413,412 | 11/1968 | Townsend | 307/234 |
| 3,502,911 | 3/1970 | Lehman | 307/235 X |
| 3,546,482 | 12/1970 | Bader et al. | 307/261 X |
| 3,617,904 | 11/1971 | Marino | 307/234 |

*Primary Examiner*—Andrew J. James
*Attorney, Agent, or Firm*—D. D. Dubosky

[57] ABSTRACT

A pulse width discriminator is disclosed which discriminates between horizontal sync pulses and vertical sync pulses by producing an output pulse in response to the trailing edge of each horizontal sync pulse and inhibiting an output pulse that would otherwise be produced in response to the trailing edge of each vertical sync pulse.

3 Claims, 5 Drawing Figures

PULSE WIDTH DISCRIMINATOR

BACKGROUND OF THE INVENTION

This invention relates to pulse width discriminator circuits and, more particularly, to pulse width discriminator circuits that discriminate between the horizontal and vertical sync pulses of a video signal.

In video transmission systems, the horizontal and vertical sync pulses in addition to maintaining line, field and frame synchronization, also provide timing information to various other receiver circuits such as automatic gain and phase controls. Generally, timing information has been recovered by examining when the leading edge of each horizontal and vertical sync pulse occurs, since the leading edges of each synchronizing pulse occur at fixed intervals. However, in video transmission systems such as the video telephone system, the leading edge of each synchronizing pulse is subject to the presence of signal noise and transmission impairments.

The trailing edge of each synchronizing pulse has been found to be a more dependable source of timing information in the presence of noise and transmission impairments. However, since each horizontal sync pulse has a shorter duration than each vertical sync pulse, the trailing edges of the synchronizing pulses do not occur at uniform intervals. Further, in video systems in which each video frame comprises two interlaced fields, the vertical sync pulse may have a variable pulse width. Therefore, although the trailing edges of each consecutive horizontal sync pulse are indicative of the desired timing information, a response to the trailing edge of a vertical sync pulse would produce erroneous timing information to time sensitive receiver circuits. The effect on the receiver circuits of an erroneous timing pulse has been found to be more deleterious than the absence of a timing pulse at a time when it should occur.

An object of this invention is to produce an output timing pulse in response to the trailing edge of each horizontal sync pulse.

SUMMARY OF THE INVENTION

In the pulse discriminator of the present invention, a signal comprising pulses of various durations such as horizontal sync pulses and vertical sync pulses is applied to two signal paths. The first path comprises an RC differentiating network connected between the input source and the base of a common emitter transistor normally biased to be in the conductive state. The second path includes an RC integrating network connected between the input source and the base of a second common emitter transistor normally biased to be in the non-conductive state. The collector of the first transistor is connected to the collector of the second transistor and the emitters of the first and second transistors are connected to a ground potential.

An output pulse is thus produced at the collector output of the first transistor in response to the trailing edge of each horizontal sync pulse. However, the output pulse that would normally be produced at the collector output of the first transistor in response to the trailing edge of each vertical sync pulse is inhibited when the charging voltage across the capacitor in the RC integrating network, in response to the longer vertical sync pulse, triggers the second transistor into the conductive state, thereby effectively grounding the collector output terminal of the first transistor. Therefore, an output pulse is produced in response to the trailing edge of only each horizontal sync pulse while the pulse that would otherwise be produced in response to the trailing edge of each vertical sync pulse is inhibited.

BRIEF DESCRIPTION OF THE DRAWINGS

Other objects and features of the present invention will be readily apparent from the following discussion and drawings in which.

DETAILED DESCRIPTION

Figure 1:
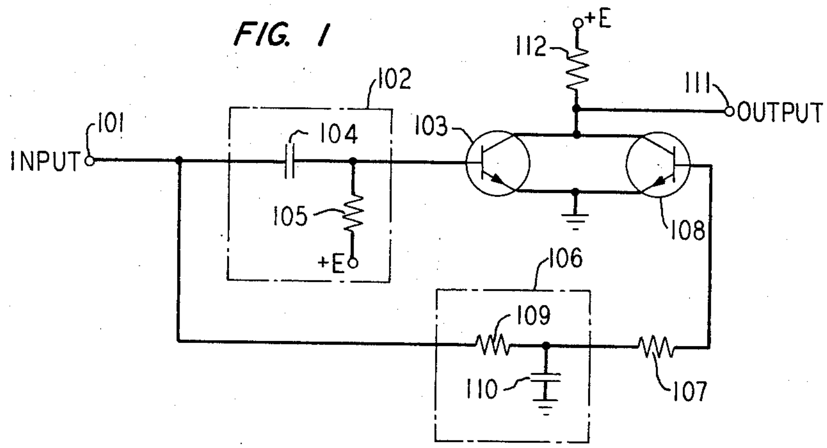
FIG. 1 illustrates a circuit embodiment of the pulse discriminator of the present invention.

An embodiment of the pulse discriminator of the present invention is illustrated in FIG. 1. Prior to being applied to input terminal 101, the analog video picture information is removed from a video signal by employing techniques well known in the art. The resultant signal comprising shorter horizontal sync pulses and longer vertical sync pulses is applied to input terminal 101. A first signal path comprising RC differentiating network 102 is connected between input terminal 101 and the base electrode of transistor 103. RC differentiating network 102 is formed by the combination of capacitor 104 connected between input terminal 101 and the base electrode of transistor 103; and resistor 105 connected between the base electrode of transistor 103 and a source of positive potential. A second signal path comprising the series combination of RC integrating network 106 and resistor 107 is serially connected between input terminal 101 and the base electrode of transistor 108. RC integrating network 106 is formed by the combination of resistor 109 connected between input terminal 101 and a first terminal of resistor 107; and capacitor 110 connected between the first terminal of resistor 107 and a source of a reference ground potential. The second terminal of resistor 107 is connected to the base electrode of transistor 108.

The emitter electrodes of both transistors 103 and 108 are connected to the source of the reference ground potential. The collector electrodes of both transistors 103 and 108 are connected directly together and to output terminal 111. Resistor 112 is connected between the point of interconnection of the collector electrodes of transistors 103 and 108 and a source of positive potential.

In the absence at terminal 101 of a synchronizing pulse, the positive potential applied to resistor 105 maintains the base-emitter junction of transistor 103 in a forward biased condition. Transistor 103 is thus normally biased to be in the conductive or ON state. The potential of the collector electrode of transistor 103 with respect to ground is therefore equal to the voltage across the collector-emitter electrodes of transistor 103. For purposes of discussion hereinafter, when either transistor 103 or 108 is in the conductive state, the collector-emitter voltages of this transistor will be assumed to be negligible with respect to the input voltages and the source of positive potential. Therefore, when either transistor 103 or 108 is in its ON state, output terminal 111 will be at the reference ground potential.

Similarly, in the absence of a positive potential at the base electrode of transistor 108, the emitter-base junction of transistor 108 is reverse biased. Therefore, transistor 108 is normally in the non-conductive or OFF state.

Figure 2A:
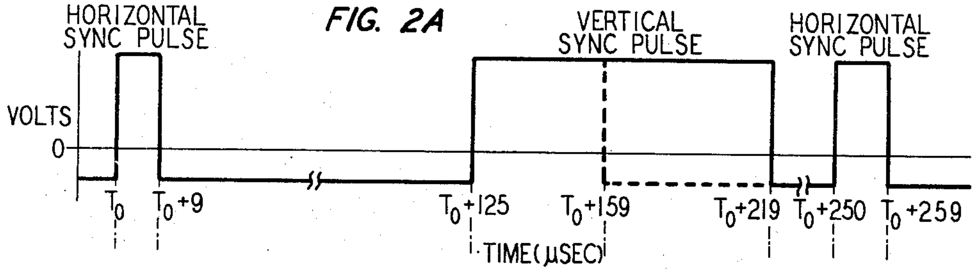
FIG. 2A is an illustrative input signal comprising horizontal and vertical sync pulses.
Figure 2B:
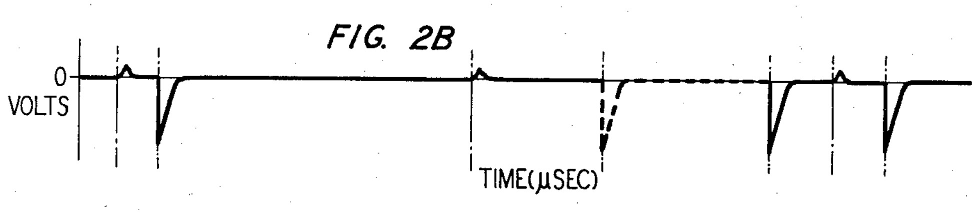
FIGS. 2B and 2C are waveforms useful in explaining the operation of the circuit of FIG. 1.

The waveforms illustrated in FIGS. 2A–2D are useful in explaining the operation of the circuit of FIG. 1. For present illustrative purposes only, the leading edge of each synchronizing signal will be assumed to occur at 125 μs intervals. The duration of the horizontal sync pulses will be assumed to be 9 μs. The duration of the vertical sync pulses will be assumed to be either 34 μs or 96 μs, as determined by which field of an interlaced frame is being received. An example of an input signal at input terminal 101 comprising horizontal and vertical sync pulses as noted above is illustrated in FIG. 2A. As illustrated in FIGS. 2A and 2B of the present drawing, where FIG. 2B represents the potential with respect to ground of the base electrode of transistor 103, a positive voltage impulse is produced in response to the leading edge of each horizontal sync pulse at the base electrode of transistor 103.

Since transistor 103 is usually biased in the conductive state and cannot be turned further ON, transistor 103 appears as a resistive load at the output of differentiating network 102. Further, since the emitter electrode of transistor 103 is at ground potential, the potential of the base electrode cannot normally increase above the threshold voltage that triggers transistor 103 into the conductive state. Therefore, the positive impulse produced at the base electrode of transistor 103 by differentiating network 102 in response to the leading edge of the horizontal sync pulse has a small magnitude as compared with the magnitude of the sync pulse. Simultaneously, as shown in the waveform of FIG. 2C, which represents the voltage across capacitor 110, capacitor 110 begins to charge in response to the horizontal sync pulse to produce an exponentially increasing voltage across capacitor 110 and thus also at the base electrode of transistor 108.

With reference again to FIGS. 2A and 2B, differentiating network 102 produces a negative voltage impulse at the base electrode of transistor 103 in response to the trailing edge of the 9 μs horizontal sync pulse. The negative impulse reverse biases the base-emitter junction of transistor 103 to trigger the transistor into its non-conductive state. When transistor 103 is in the OFF state, it does not load the output of differentiating network 102, and thus the amplitude of the negative voltage impulse at the base electrode of transistor 103 is greater than the impulse produced in response to the leading edge of the horizontal sync pulse.

Figure 2C:
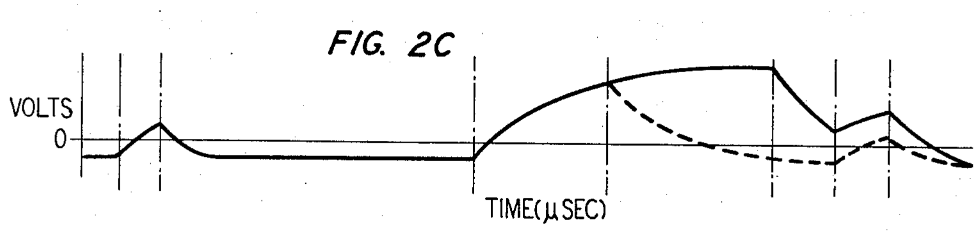

As shown in FIG. 2C, the voltage across capacitor 110 exponentially decreases in response to the trailing edge of the horizontal sync pulse. By selecting the resistor 109-capacitor 110 time constant at an appropriate value, the maximum amplitude of the voltage applied to the base of transistor 108 in response to 9 μs horizontal sync pulses may be controlled to be less than the voltage that will trigger transistor 108 into the conductive state. For example, when silicon transistors are used, 0.6 volts must be applied across the base-emitter junction in order to trigger the transistor into the conductive state. Therefore, if the resistor 109-capacitor 110 time constant is chosen so that the maximum amplitude of the voltage applied to the base electrode of transistor 108 in response to each 9 μs horizontal sync is less than 0.6 volts, then transistor 108 remains in the non-conductive state. Thus, by properly selecting the time constant of integrating network 106, transistor 108 will be non-responsive to each 9 μs horizontal sync pulse.

Figure 2D:
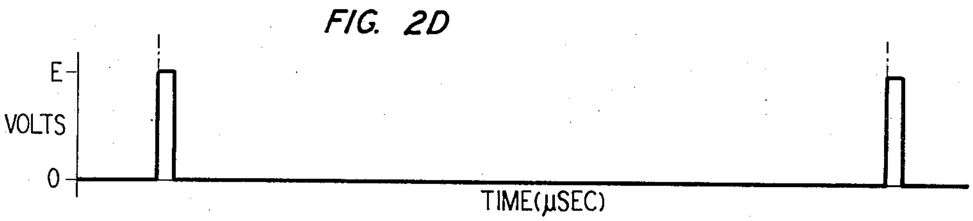
FIG. 2D is the output signal of the circuit of FIG. 1 corresponding to the input signal of FIG. 2A.

As can be seen from the waveform of FIGS. 2A and 2D, where the waveform of FIG. 2D represents the potential at output terminal 111, a negative voltage impulse at the base of transistor 103 in response to the trailing edge of a horizontal sync pulse triggers transistor 103 into the OFF state. An output pulse is thus produced at the output terminal 111 for the interval that transistor 103 remains in the non-conductive state. When both transistors 103 and 108 are in the OFF state, the potential of output terminal 111 is equal to the source of positive potential applied to resistor 112 which, as illustrated in FIGS. 1 and 2D, is equal to E.

As illustrated in FIG. 2A, a vertical sync pulse is applied to input terminal 101 at 125 μs following the leading edge of a horizontal sync pulse. As noted heretofore, a vertical sync pulse may have a duration of either 34 or 96 μs. The dotted lines in FIGS. 2A through 2C represent the response to a 34 μs vertical sync pulse, and the solid lines represent the response to a 96 μs vertical sync pulse.

In the manner discussed heretofore in connection with the response of the circuit of FIG. 1 to a horizontal sync pulse, RC differentiating network 102 produces a positive impulse of small amplitude at the base of transistor 103 in response to the leading edge of the vertical sync pulse. Simultaneously in response to the vertical sync pulse, the charging voltage across capacitor 110 in integrating network 106 increases exponentially. However, since the duration of the vertical sync pulse is greater than the duration of the horizontal sync pulses, the voltage across capacitor 110 reaches an amplitude sufficient to forward bias the base-emitter junction of transistor 108 and trigger transistor 108 into the conductive state. Thus, once the potential of the base electrode of transistor 108 equals the base-emitter threshold voltage, transistor 108 switches to the ON state. Since the emitter electrode of transistor 108 is at ground potential, once transistor 108 is triggered into the conductive state, the potential of the base electrode cannot be greater than the base-emitter threshold voltage. Thus, if integrating network 106 was connected directly to the base electrode of transistor 108, the voltage across capacitor 110 would not increase higher than the base-emitter threshold voltage since transistor 108 would appear as a resistive load once it was triggered into the ON state. However, since resistor 107 is connected between RC integrating network 106 and the base electrode of transistor 108, the potential of the base electrode of transistor 108 may be maintained at the threshold voltage while the voltage across capacitor 110 increases above that level.

With reference again to FIGS. 2A and 2B, RC differentiating network 102 produces a negative voltage impulse at the base electrode of transistor 103 in response to the trailing edge of the vertical sync pulse. This negative voltage impulse reverse biases the base-emitter junction of transistor 103 into the OFF state. Simultaneously in response to the trailing edge of the vertical sync pulse, the voltage across capacitor 110 begins to exponentially decrease. Since, as heretofore noted, the voltage across capacitor 110 has increased above the turn-on voltage of transistor 108, the base electrode of transistor 108 remains at the threshold voltage and thus transistor 108 remains in the ON state for an interval following the trailing edge of the vertical sync pulse. By properly selecting the time constant of resistor 109-capacitor 110 as combined with resistor 107, and the resistor 105-capacitor 104 time constant, transistor 108 will remain in the conductive state for the interval that transistor 103 is in the non-conductive state. Therefore, as shown in FIG. 2D, the collector electrode of transistor 108 remains at ground potential and an output pulse is inhibited from being produced at the collector electrode of transistor 103. However, once the potential of the base electrode of transistor 108 falls below the threshold voltage, transistor 108 returns to its normal non-conductive state and remains in the non-conductive state until the next vertical sync pulse triggers it into the ON state. Thus, until the next vertical sync pulse, a pulse is produced at output terminal 111 in response to the trailing edge of each horizontal sync pulse.

In summary, then, the pulse discriminator of the present invention produces an output pulse in response to the trailing edge of each horizontal sync pulse in a signal comprising pulses of different durations, as, for example, horizontal and vertical sync pulses. The output pulse that would normally be produced in response to the trailing edge of each vertical sync pulse, however, is inhibited. Although silicon transistors were noted above as serving a possible use, the invention is not so limited and transistor 103 and transistor 108 do not have to be of the same semiconductor material.

The pulse discriminator of the present invention may therefore be used in most, if not all, applications in which pulse discrimination must be made on the basis of pulse width. The above-described arrangement is illustrative of the application of the principles of the invention. Other embodiments may be devised by those skilled in the art without departing from the spirit and scope thereof.

What is claimed is:

1. A pulse width discriminator comprising an input terminal for receving input pulses having various durations, an output terminal, a source of reference potential, first and second transistors each having base, emitter and collector electrodes, means for directly connecting the collector electrode of said first transistor to the collector electrode of said second transistor and to said output terminal, means for directly connecting the emitter electrode of said first transistor to the emitter electrode of said second transistor and to said source of reference potential, a differentiating network connected in a first signal path between said input terminal and the base electrode of said first transistor, said first transistor changing to a nonconductive state in response to the trailing edge of each input pulse, an integrating network and a first resistor serially connected in a second signal path between said input terminal and the base electrode of said second transistor, the time constant of said integrating network being sufficient to change said second transistor to a conductive state in response to input pulses having a duration greater than a predetermined length, said first resistor being chosen in combination with the time constant of said integrating network and the time constant of said differentiating network such that in response to input pulses having a duration greater than said predetermined length, said second transistor remains in the conductive state for at least the time interval during which said first transistor is in the nonconductive state, thereby producing an output pulse at said output terminal for each input pulse having a duration less than said predetermined length, and inhibiting an output pulse for each input pulse having a duration greater than said predetermined length.

2. A pulse width discriminator in accordance with claim 1 wherein a second resistor is connected between said output terminal and a second source of potential, said differentiating network being an RC differentiating network comprising a first capacitor connected between said input terminal and the base electrode of said first transistor, and a third resistor connected between a third source of potential and the base electrode of said first transistor, and said integrating network being an RC integrating network comprising a fourth resistor connected between said input terminal and the base electrode of said second transistor, and a second capacitor connected between the base electrode of said second transistor and said source of reference potential.

3. A pulse width discriminator comprising an input terminal for receiving input pulses having various durations, an output terminal, a first source of reference potential, a second and third source of potential, first and second transistors each having base, emitter and collector electrodes, means for directly connecting the collector electrode of said first transistor to the collector electrode of said second transistor and to said output terminal, means for directly connecting the emitter electrode of said first transistor to the emitter electrode of said second transistor and to said first source of reference potential, a first capacitor connected between said input terminal and the base electrode of said first transistor, a first resistor connected between said base electrode of said first transistor and said second source of potential, a second resistor and a third resistor connected in series between said input terminal and the base electrode of said second transistor, a second capacitor connected between said first source of reference potential and the junction of said second resistor and said third resistor, a fourth resistor connected between said third source of potential and said output terminal, said first transistor changing to a nonconductive state in response to the trailing edge of each input pulse, the time constant formed by the product of the resistance of said second resistor and the capacitance of said second capacitor being sufficient to change said second transistor to a conductive state in response to input pulses having a duration greater than a predetermined length, said third resistor being chosen in combination with the time constant formed by the product of the resistance of said second resistor and the capacitance of said second capacitor such that in response to input pulses having a duration greater than said predetermined length, said second transistor remains in the conductive state for at least the time interval during which said first transistor is in the nonconductive state, thereby providing an output pulse at said output terminal for each input pulse having a duration less than said predetermined length, and inhibiting an output pulse for each input pulse having a duration greater than said predetermined length.

* * * * *